US008665811B2

(12) United States Patent  
Nory et al.

(10) Patent No.: US 8,665,811 B2
(45) Date of Patent: Mar. 4, 2014

(54) REFERENCE SIGNAL FOR A CONTROL CHANNEL IN WIRELESS COMMUNICATION NETWORK

(75) Inventors: Ravikiran Nory, Buffalo Grove, IL (US); Vijay Nangia, Algonquin, IL (US); Ajit Nimbalker, Buffalo Grove, IL (US); Krishan Kamal Sayana, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 183 days.

(21) Appl. No.: 13/210,317

(22) Filed: Aug. 15, 2011

(65) Prior Publication Data

US 2013/0044692 A1 Feb. 21, 2013

(51) Int. Cl.
*H04W 4/00* (2009.01)
(52) U.S. Cl.
USPC .......................................................... 370/329
(58) Field of Classification Search
USPC .......................................................... 370/329
See application file for complete search history.

(56) References Cited

U.S. PATENT DOCUMENTS

| 7,796,639 | B2 | 9/2010 | Buckely et al. |
| 7,848,438 | B2 | 12/2010 | Baum et al. |
| 2008/0049690 | A1 | 2/2008 | Kuchibhotla et al. |
| 2010/0120442 | A1 | 5/2010 | Zhuang et al. |
| 2010/0272032 | A1 | 10/2010 | Sayana et al. |
| 2011/0044391 | A1 | 2/2011 | Ji et al. |
| 2011/0268072 | A1* | 11/2011 | Lee et al. ....................... 370/329 |
| 2011/0269442 | A1 | 11/2011 | Han et al. |
| 2012/0113889 | A1 | 5/2012 | Noh et al. |
| 2012/0282935 | A1* | 11/2012 | Koivisto et al. ............... 455/450 |
| 2013/0003604 | A1* | 1/2013 | Blankenship et al. ........ 370/255 |

FOREIGN PATENT DOCUMENTS

| WO | 2011008057 A2 | 1/2011 |
| WO | 2011021852 A2 | 2/2011 |
| WO | 2011085195 A1 | 7/2011 |

OTHER PUBLICATIONS

Young-Han Nam, Evolution of reference signals for LTE-advanced systems, Feb. 2012, ISSN: 0163-6804.
Patent Cooperation Treaty, "PCT Search Report and Written Opinion of the International Searching Authority" for International Application No. PCT/US2012/046991 Dec. 3, 2012, 13 pages.
3GPP TSG RAN WG1 #60bis, R1-102345 "DM-RS for R-PDCCH" Qualcomm Incorporated; Beijing, China; Apr. 12-16, 2010, 6 pages.

(Continued)

*Primary Examiner* — Chi Pham
*Assistant Examiner* — Fahmida Chowdhury

(57) ABSTRACT

A wireless communication terminal receives a first set of pilot signal resource elements and control information in spatial layers in a first resource block in a subframe and a second set of pilot signal resource elements and data in spatial layers in a second resource block in the subframe, wherein the first and second resource blocks span a set of time symbols in a subframe, the first resource blocks span a first set of frequency carriers in the sub-frame, and the second resource blocks span a second set of frequency carriers in the sub-frame. The terminal decodes the spatial layers in which the control information is received using the first set of pilot signal resource elements. The terminal also decodes the spatial layers in which the data are received in the second resource block using the second set of pilot signal resource elements.

14 Claims, 16 Drawing Sheets

(56) References Cited

OTHER PUBLICATIONS

3GPP TSG RAN WG1 #58, R1-093303 "UE-specific reference symbol multiplexing for LTE-Advanced downlink" Nokia, Nokia Siemens Networks; Shenzhen, China; Aug. 24-28, 2009, 10 pages.

3GPP TS 36.216 v10.2.0 (Mar. 2011) 3rd Generation Partnership Project; Technical Specification Group Radio Access Network; Evolved Universal Terrestrial Radio Access (E-UTRA); Physical layer for relaying operation (Release 10), 16 pages.

\* cited by examiner

REFERENCE SIGNAL FOR A CONTROL CHANNEL IN WIRELESS COMMUNICATION NETWORK

FIELD OF THE DISCLOSURE

The present disclosure relates generally to wireless communications, and more particularly to a reference signal structure for receiving a control channel in a wireless communication system.

BACKGROUND

In current 3$^{rd}$ Generation Partnership Project (3GPP) Long Term Evolution (LTE) systems, Releases 8, 9 and 10, downlink (DL) control signaling from a base station (or eNB) is received by a User Equipment (UE) in the first 1/2/3/4 symbols of a sub-frame. The remaining symbols are used for receiving data. Control signaling is spread across the entire carrier bandwidth (BW) of the sub-frame and the control signaling is received by the UE on a Physical Downlink Control Channel (PDCCH). Data is received by the UE in select Resource Blocks (RBs) occupying either the entire carrier BW or a portion of the BW. Data is received on Physical Downlink Shared Channel (PDSCH). The frame structure received at the UE is illustrated in FIGS. 1A through 1C.

The UE needs to perform channel estimation after receiving the PDCCH to decode the information sent on PDCCH. To perform channel estimation, UE receives Reference Signals (RSs) or pilot symbols in the sub-frame. The reference symbols are associated with one or more antenna ports. For LTE Releases 8, 9 and 10, the UE uses the reference signals associated with one or more of antenna ports 0, 1, 2, 3 for receiving the PDCCH. The RS structure for antenna ports 0, 1, 2, 3 is shown in FIGS. 1A through 1C wherein resource elements R0, R1, R2, R3 carry reference signals associated with antenna ports 0, 1, 2, 3, respectively. An antenna port is defined such that a channel over which a symbol on the antenna port is conveyed can be inferred from the channel over which another symbol on the same antenna port is conveyed.

For LTE Release 10 (Rel-10), for demodulating data (sent on PDSCH) the UE can either use reference signals associated with antenna ports 0, 1, 2, 3 or use reference signals associated with all or a subset of other antenna ports 7, 8, 9, 10, 11, 12, 13, 14 based on the transmission scheme used for PDSCH reception. In 3GPP LTE, the transmission scheme depends on configuration signaling from eNB. The reference signals associated with these other antenna ports are typically referred to as "UE specific reference signals (UERS)" or "Demodulation reference signals (DMRS)" or "Dedicated reference signals (DRS)". The reference signals associated with antenna ports 0, 1, 2, 3 are typically referred to as "Common Reference Signals (CRS)". While the CRS are sent across the entire carrier bandwidth by the eNB, DMRS can only be present in those RBs for which the UE has a PDSCH assignment. So, for receiving PDSCH using DMRS, the UE can only use the DMRS present on those RBs for which it has a PDSCH assignment.

For LTE Rel-11, it is envisioned that new DL control signaling will be sent by the base station to the UE in symbols that span a first slot of the sub-frame or in symbols that span both the first and second slots of the sub-frame. The new DL control signaling is generally referred to as the Enhanced—PDCCH (E-PDCCH). Unlike the PDCCH, which is transmitted across the entire channel bandwidth, the UE is expected to receive the E-PDCCH in a set of RBs that may span only a portion of the carrier bandwidth in the frequency domain. Also, unlike the PDCCH which is received by the UE using CRS, it is envisioned that the E-PDCCH can be received by the UE using DMRS.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

For LTE Rel-11, it is envisioned that new DL control signaling will be sent by the base station to the UE in symbols that span a first slot of the sub-frame or in symbols that span both the first and second slots of the sub-frame. The new DL control signaling is generally referred to as the Enhanced—PDCCH (E-PDCCH). Unlike the PDCCH, which is transmitted across the entire channel bandwidth, the UE is expected to receive the E-PDCCH in a set of RBs that may span only a portion of the carrier bandwidth in the frequency domain. Also, unlike the PDCCH which is received by the UE using CRS, it is envisioned that the E-PDCCH can be received by the UE using DMRS.

Figure 1A:
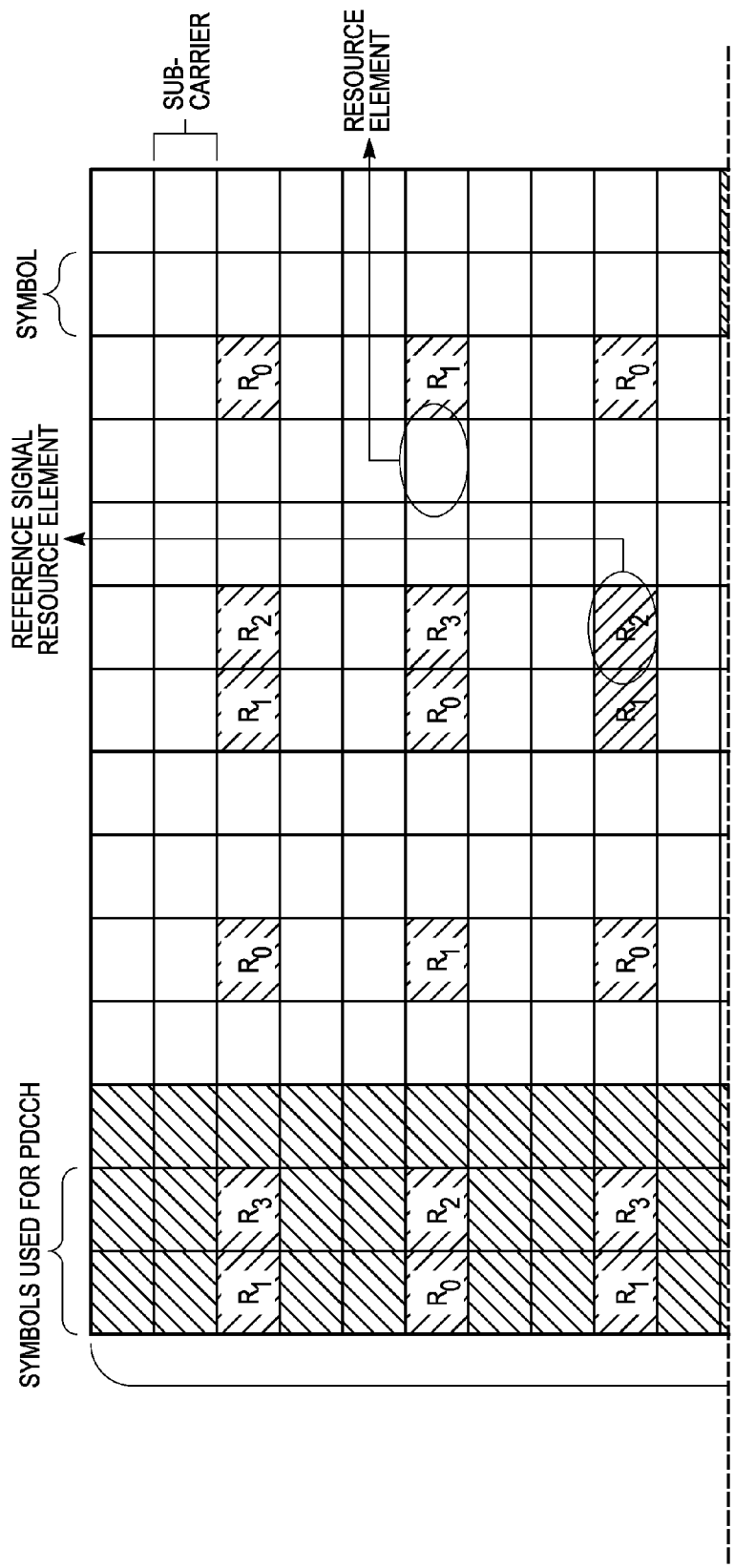
FIGS. 1A through 1C show a prior art frame structure received at a UE.
Figure 1B:
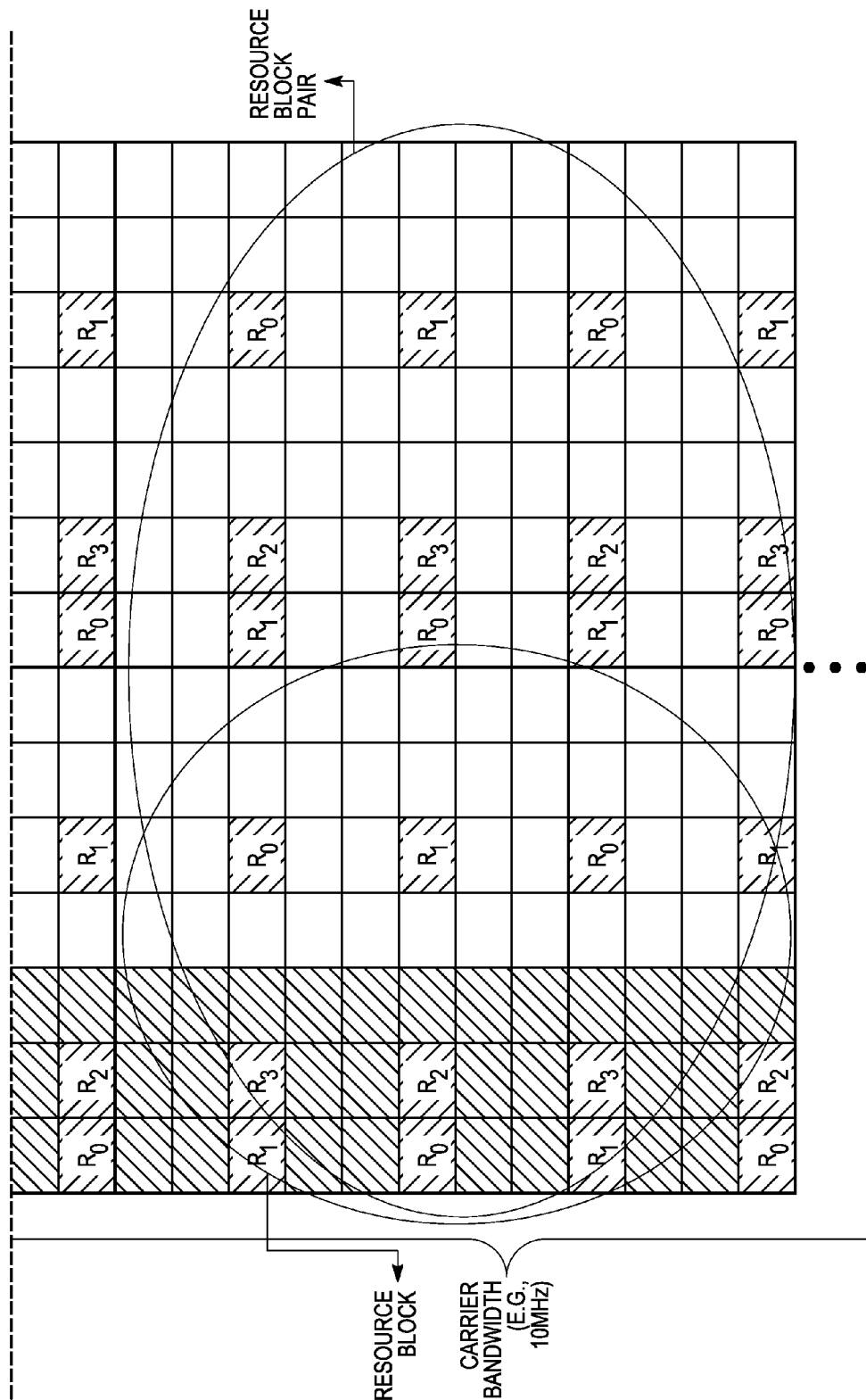
Figure 1C:
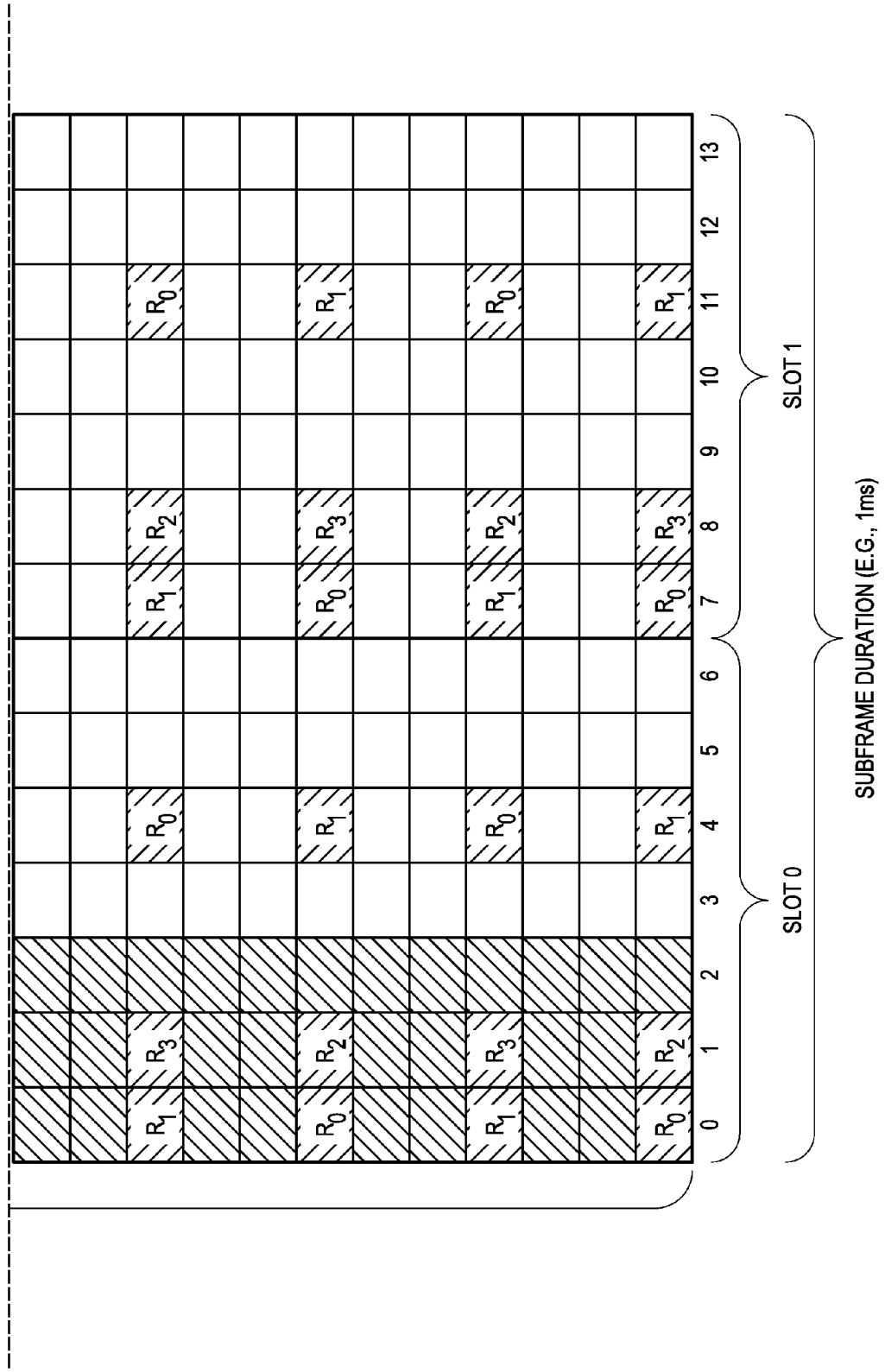
Figure 2A:
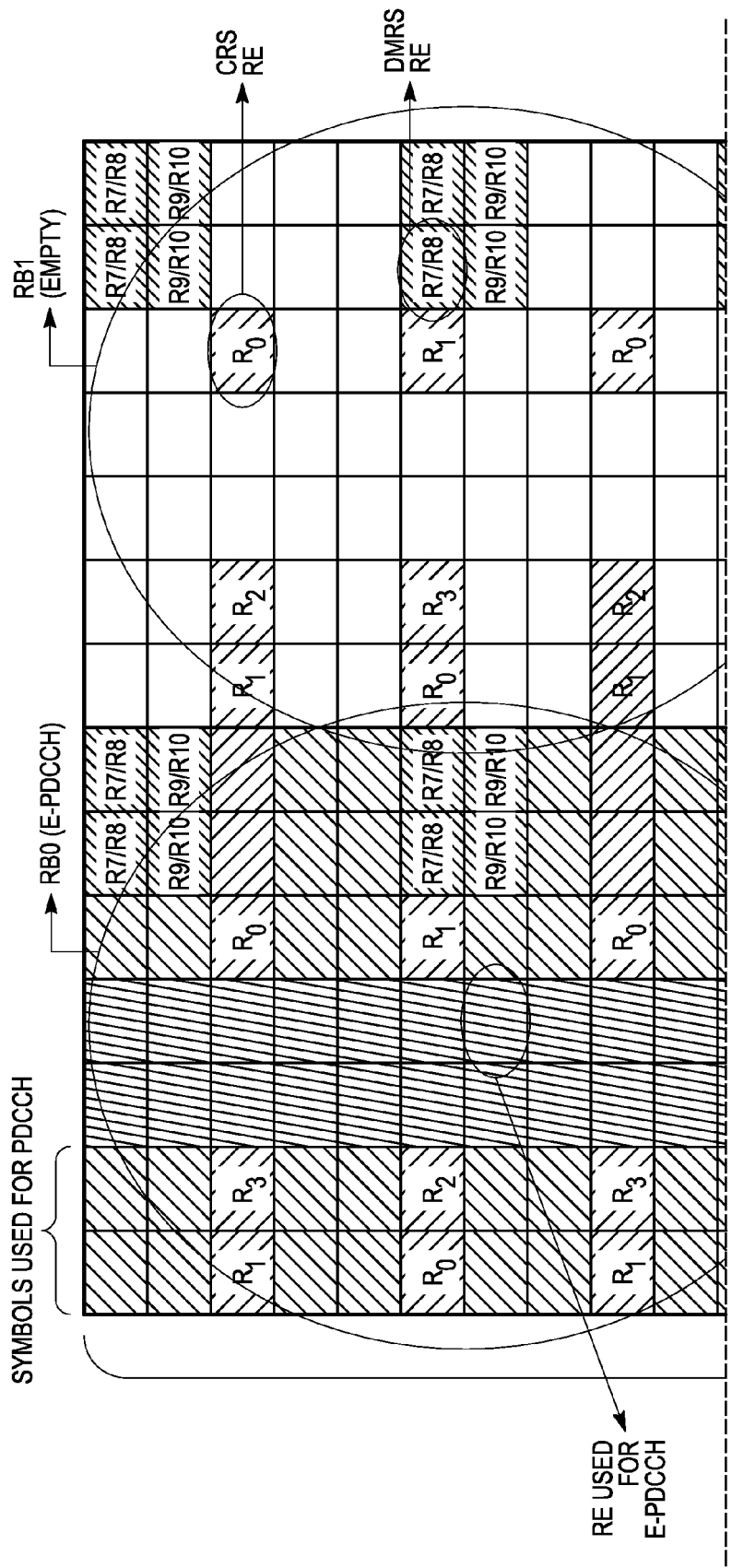
FIGS. 2A through 2C show a possible LTE Rel-11 frame structure received at a UE.
Figure 2B:
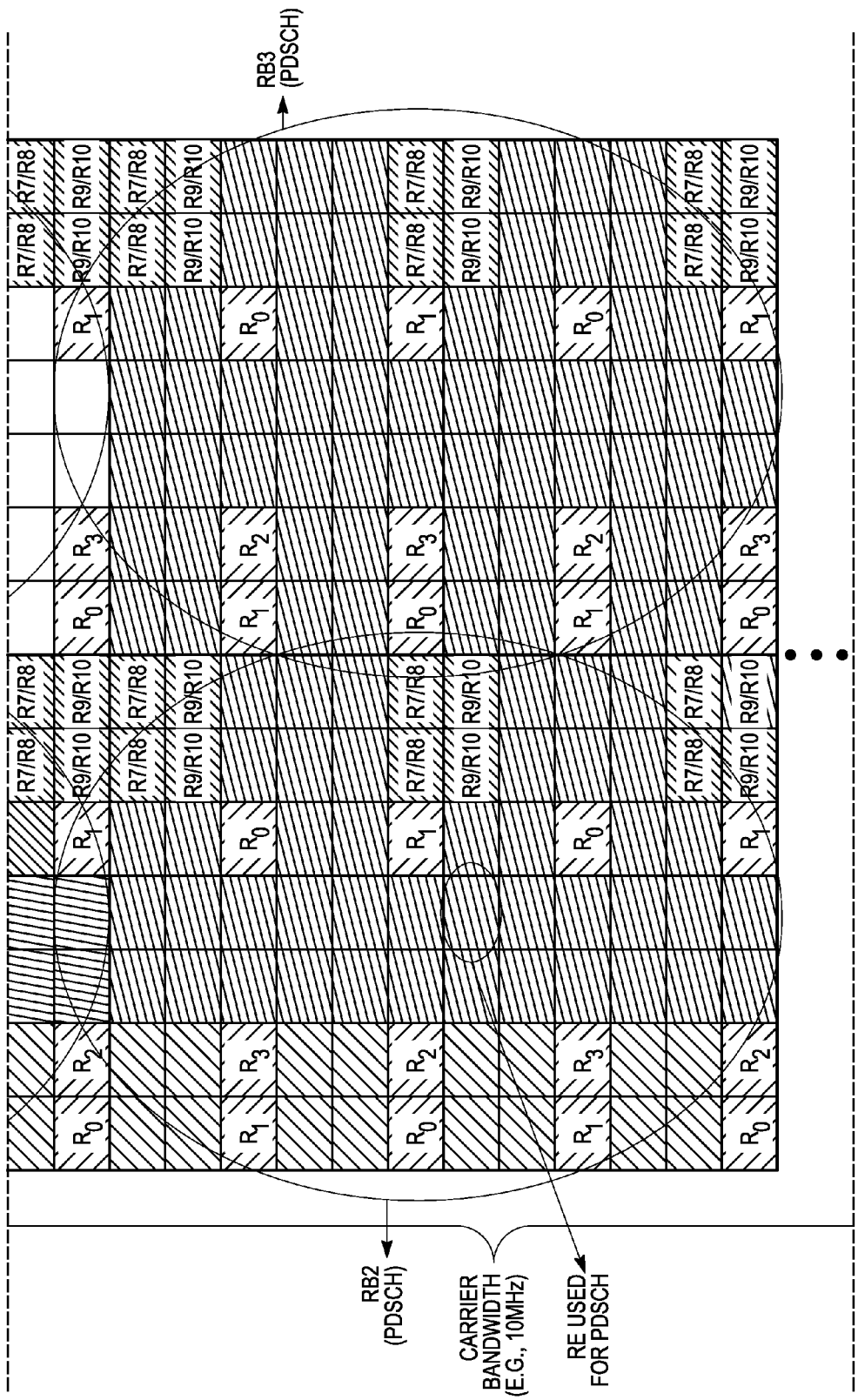
Figure 2C:
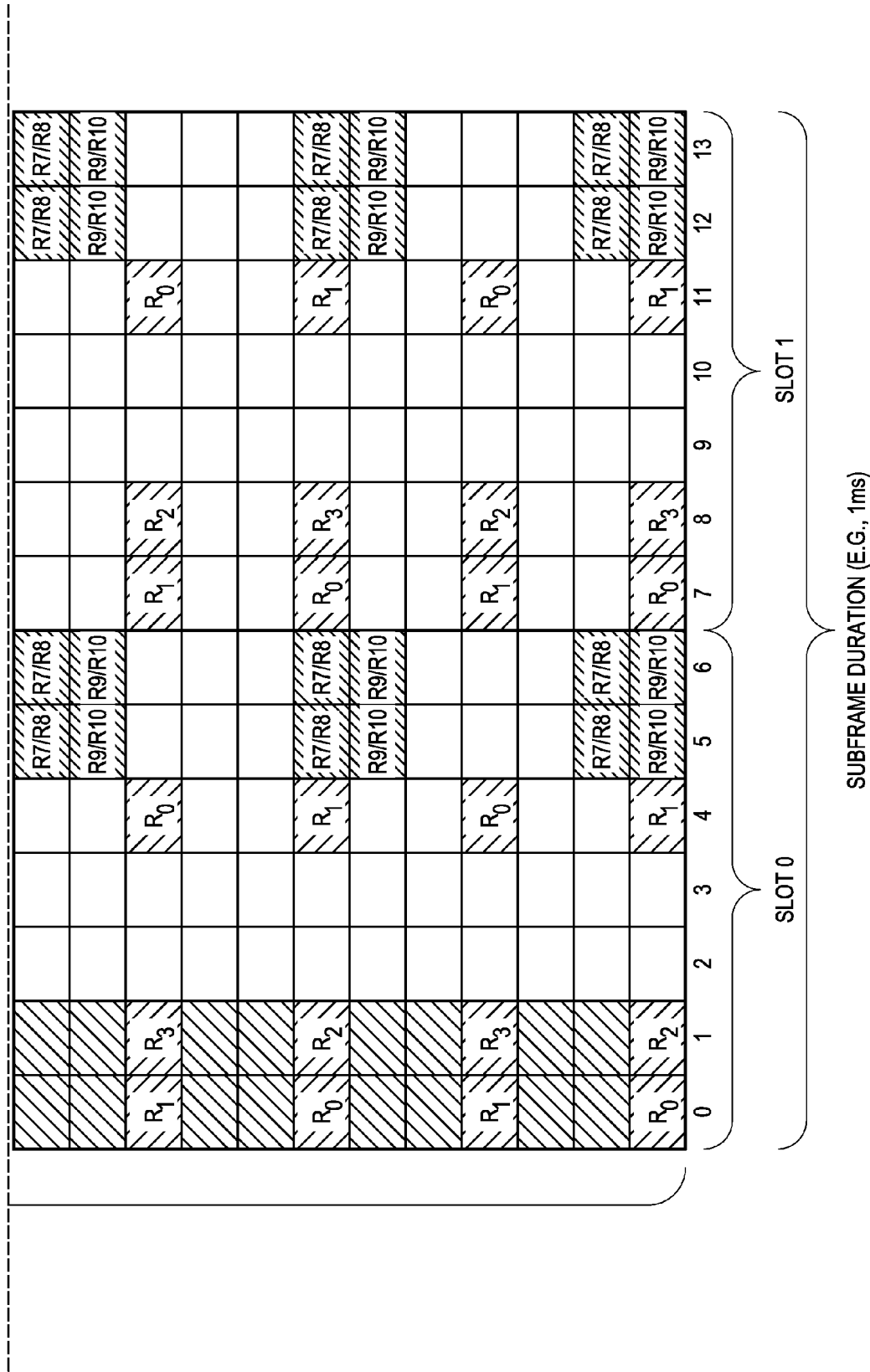

FIGS. 2A through 2C show a sub-frame in which the UE is expected to receive E-PDCCH and PDSCH. In FIGS. 2A through 2C, in the vertical scale, multiple blocks of frequency also referred to as frequency carriers or frequency subcarriers or frequency bins are shown. In the horizontal scale, multiple blocks of time (in units of OFDM symbols) are shown. The subframe comprises multiple resource blocks (RBs) such as Resource Block 0 (RB0), Resource Block 1 (RB1), Resource Block 2 (RB2), and Resource Block 3 (RB3), wherein each RB comprises a plurality of subcarriers such as 12 OFDM subcarriers over a time slot comprising a plurality of OFDM symbols such as seven (7) OFDM symbols in 3GPP LTE for normal cyclic prefix. Typically, the subframe duration is 1 ms (14 symbols for normal cyclic prefix.) and it consists of two time slots of 0.5 ms (7 symbols for normal cyclic prefix.) duration each. Each RB can be further divided into multiple resource elements (REs), wherein each RE can be a single OFDM subcarrier on a single OFDM symbol. In the example subframe shown in FIGS. 2A through 2C, E-PDCCH is sent to the UE in RB0 and PDSCH is sent to the UE in RB1 & RB3. RB2 is shown as empty in this example but RB2 can also be used to send PDSCH or E-PDCCH to the UE. Resource Blocks can be Physical Resource Blocks (PRB) or Virtual Resource Blocks (VRB). While the description uses PRB to describe the control channel operation, each physical resource block is associated with a virtual resource block (or VRB) and the association is given by a VRB to a PRB mapping e.g. via a mapping rule. The VRB index may be considered as a resource block indexing in a logical domain. Virtual resource blocks of localized type are mapped directly to physical resource blocks whereas Virtual resource blocks of distributed type are mapped to physical resource blocks using an interleaving rule. The resource allocations can be localized or distributed, where the former may be used typically for frequency-selective scheduling, while the latter may be targeted towards enabling frequency-diverse scheduling.

The UE with multiple receive antennas communicating with a base unit with multiple transmit antennas can support Multiple-Input Multiple-Output (MIMO) communication and can receive data in one or more spatial layers in one or more resource blocks (RB). The base unit precodes the data to be communicated on a spatial layer and maps and transmit the resulting precoded data on one or more antenna port. The effective channel corresponding to a layer may in general be estimated based on reference signals mapped to one or more antenna ports. In particular, in the current specification of LTE, demodulation based on DMRS (demodulation RS or UE-specific RS) is supported based on antenna ports numbered as 7-14. And effective channels corresponding to each of the spatial layers 1-8 are mapped to each one of these antenna ports. This means that channel corresponding to a spatial layer can be estimated based on the reference signals corresponding to the antenna port associated with the layer. An antenna port is defined such that a channel over which a symbol on the antenna port is conveyed can be inferred from the channel over which another symbol on the same antenna port is conveyed.

More generally, an antenna port can correspond to any well-defined description of a transmission from one or more of antennas. As an example, it could include a beamformed transmission from a set of antennas with antenna weights being applied, where the set of antennas itself could be unknown to the UE. In this case, the effective channel can be learned from the dedicated reference signal (or the pilot signal) associated with the antenna port. The dedicated reference signal may be beamformed similar to the beamformed data transmission with the same antenna weights being applied to the set of antennas. Typically, the reference signal associated with an antenna port is at least used for channel estimation at the UE. In some particular implementations antenna port can also refer to a physical antenna port at the base unit. A reference signal associated with such an antenna port allows the UE to estimate a channel from the corresponding antenna port to the UE's receivers. Regardless of the actual configuration and weighting of the antennas, for purpose of UE demodulation, the channel estimated based on an antenna port(s) is the channel corresponding to the associated spatial layer. In certain cases, the beamforming or precoding applied at the base unit may be transparent to the UE i.e. the UE need not know what precoding weights are used by the base unit for a particular transmission on the downlink.

If a particular set of pilot signal resource elements are associated with an antenna port and, a spatial layer is mapped to that antenna port, then it can said that the UE receives the particular set of pilot signal resource elements in that spatial layer.

For cases where one spatial layer in an RB is mapped to one antenna port, the number pilot signal resource elements in the RB that the UE can use, to decode data sent in the spatial layer, is equal to the number of pilot signal resource elements in the RB associated with the one antenna port. This is the current operation in LTE Release-10 specification and previous releases.

In a future specification, a spatial layer may be mapped to multiple antenna ports. For cases where one spatial layer in an RB is mapped to multiple antenna ports, the number pilot signal resource elements in the RB that the UE can use, to decode data sent in the spatial layer, is equal to the sum of number of pilot signal resource elements in the RB associated with the multiple antenna ports.

Figure 3:
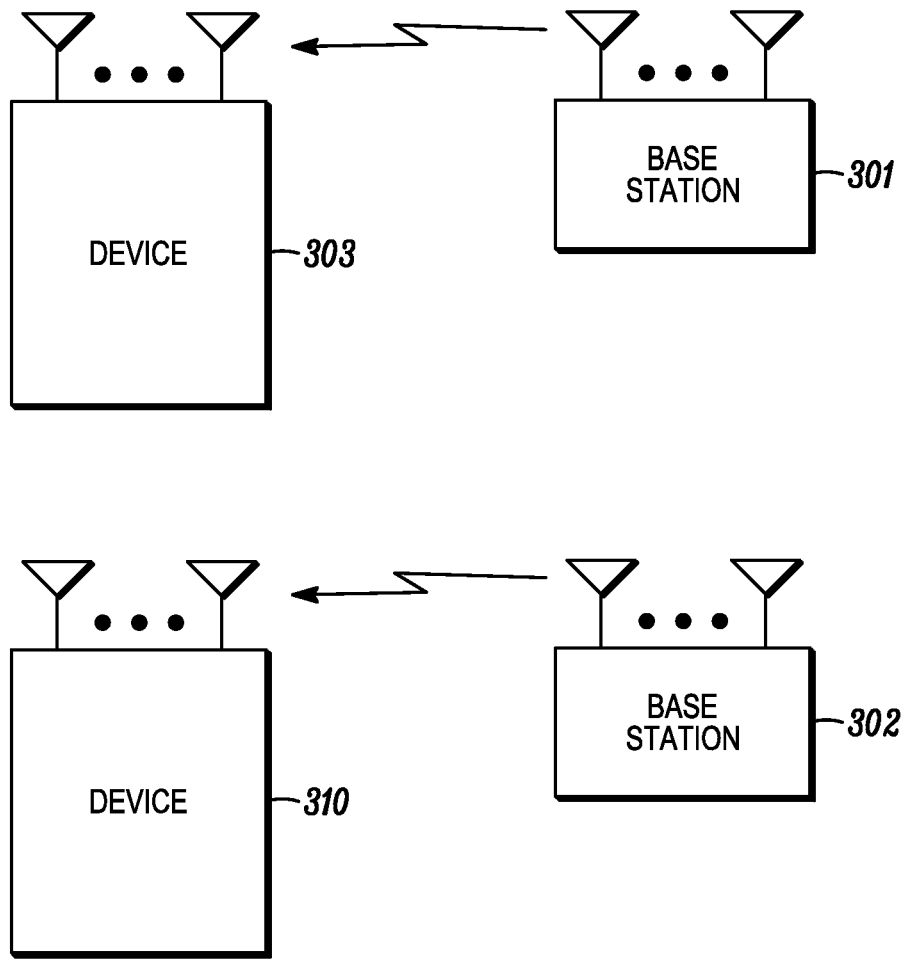
FIG. 3 illustrates a wireless communication system.

In FIG. 3, a wireless communication system 300 comprises multiple cell serving base units forming a communications network distributed over a geographical region. A base unit may also be referred to as a base station, an access point (AP), access terminal (AT), Node-B (NB), enhanced Node-B (eNB), relay node, or by other once, present or future terminology used in the art. The one or more base units 301 and 302 serve a number of remote units 303 and 310 within a serving area or cell or within a sector thereof. The remote units may be fixed units or mobile terminals. The remote units may also be referred to as subscriber units, mobile units, users, terminals, subscriber stations, user equipment (UE), user terminals, wireless communication terminal, wireless communication device or by other terminology used in the art. The network base units communicate with remote units to perform functions such as scheduling the transmission and receipt of information using radio resources. The wireless communication network may also comprise management functionality including information routing, admission control, billing, authentication etc., which may be controlled by other network entities. These and other aspects of wireless networks are known generally by those having ordinary skill in the art.

In FIG. 3, base units 301 and 302 transmit downlink communication signals to remote units 303 and 310 on radio resources, which may be in the time, and/or frequency and/or spatial domain. The remote units communicate with the one or more base units via uplink communication signals. The one or more base units may comprise one or more transmitters and one or more receivers that serve the remote units. The number of transmitters at the base unit may be related, for example, to the number of transmit antennas at the base unit. When multiple antennas are used to serve each sector to provide various advanced communication modes, for example, adaptive beam-forming, transmit diversity, transmit SDMA, and multiple stream transmission, etc., multiple base units can be deployed. These base units within a sector may be highly integrated and may share various hardware and software components. For example, a base unit may also comprise multiple co-located base units that serve a cell. The remote units may also comprise one or more transmitters and one or more receivers. The number of transmitters may be related, for example, to the number of transmit antennas 315 at the remote unit.

In one implementation, the wireless communication system is compliant with the 3GPP Universal Mobile Telecommunications System (UMTS) Long Term Evolution (LTE) protocol, also referred to as EUTRA, wherein the base unit transmits using an orthogonal frequency division multiplexing (OFDM) modulation scheme on the downlink and the user terminals transmit on the uplink using a single carrier frequency division multiple access (SC-FDMA) or a Discrete Fourier Transform spread OFDM (DFT-SOFDM) scheme. In yet another implementation, the wireless communication system is compliant with the 3GPP Universal Mobile Telecommunications System (UMTS) LTE-Advanced protocol, also referred to as LTE-A or some later generation or release of LTE wherein the base unit transmits using an orthogonal frequency division multiplexing (OFDM) modulation scheme on a single or a plurality of downlink component carriers and the user terminals can transmit on the uplink using a single or plurality of uplink component carriers. More generally the wireless communication system may implement some other open or proprietary communication protocol, for example, WiMAX, among other existing and future protocols. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division and/or spatial division multiplexing/multiple access techniques, or a combination of these various techniques. In alternative embodiments, the wireless communication system may utilize other communication system protocols including, but not limited to, TDMA or direct sequence CDMA. The communication system may be a TDD (Time Division Duplex) or FDD (Frequency Division Duplex) system. The disclosure is not intended to be implemented in any particular wireless communication system architecture or protocol.

Figure 4:
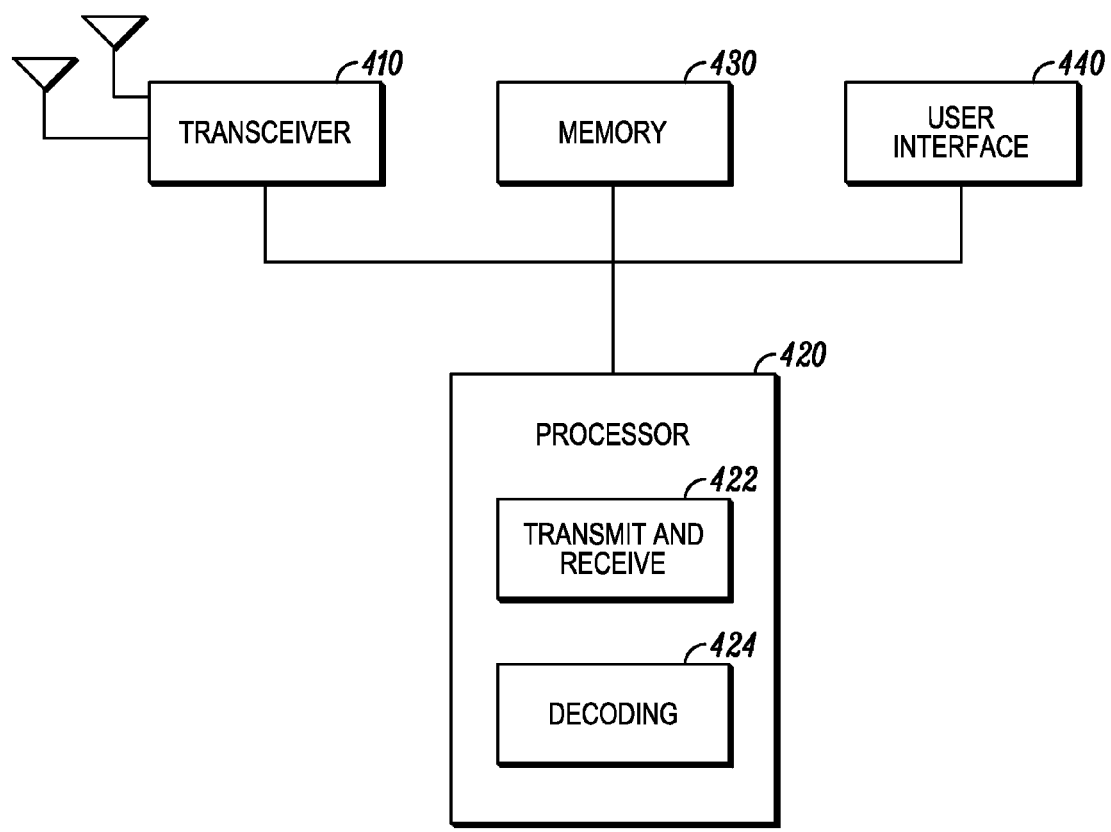
FIG. 4 illustrates a schematic block diagram of a wireless communication device and a companion accessory.

FIG. 4 illustrates a schematic block diagram of a wireless communication device 400 comprising generally a wireless transceiver 410 configured to communicate pursuant to a wireless communication protocol examples of which are discussed. The wireless transceiver 410 is representative of a first transceiver that communicates pursuant to a first wireless communication protocol and possibly a second transceiver that communicates pursuant to a second wireless communication protocol like the WiFi or Bluetooth protocols. In one embodiment, the first protocol is a cellular communication protocol like 3GPP LTE or some other known or future wireless protocols examples of which were described above.

In FIG. 4, the transceiver 410 is communicably coupled to a processor 420, and includes functionality 422 that controls the transmission and reception of information by the one or more transceivers. The transceiver also includes functionality 424 that decodes information received by the one or more transceivers. These and other aspects of the disclosure are described further below. The functionality of the controller is readily implemented as a digital processor that executes instructions stored in memory 430, which may be embodied as firmware or software stored in a memory device. When implemented as a user terminal or User Equipment (UE), the device 400 also includes a user interface 440 that typically includes tactile, visual and audio interface elements as is known generally by those having ordinary skill in the art. Other aspects of the terminal 400 that pertain to the instant disclosure are described further below.

Figure 5:
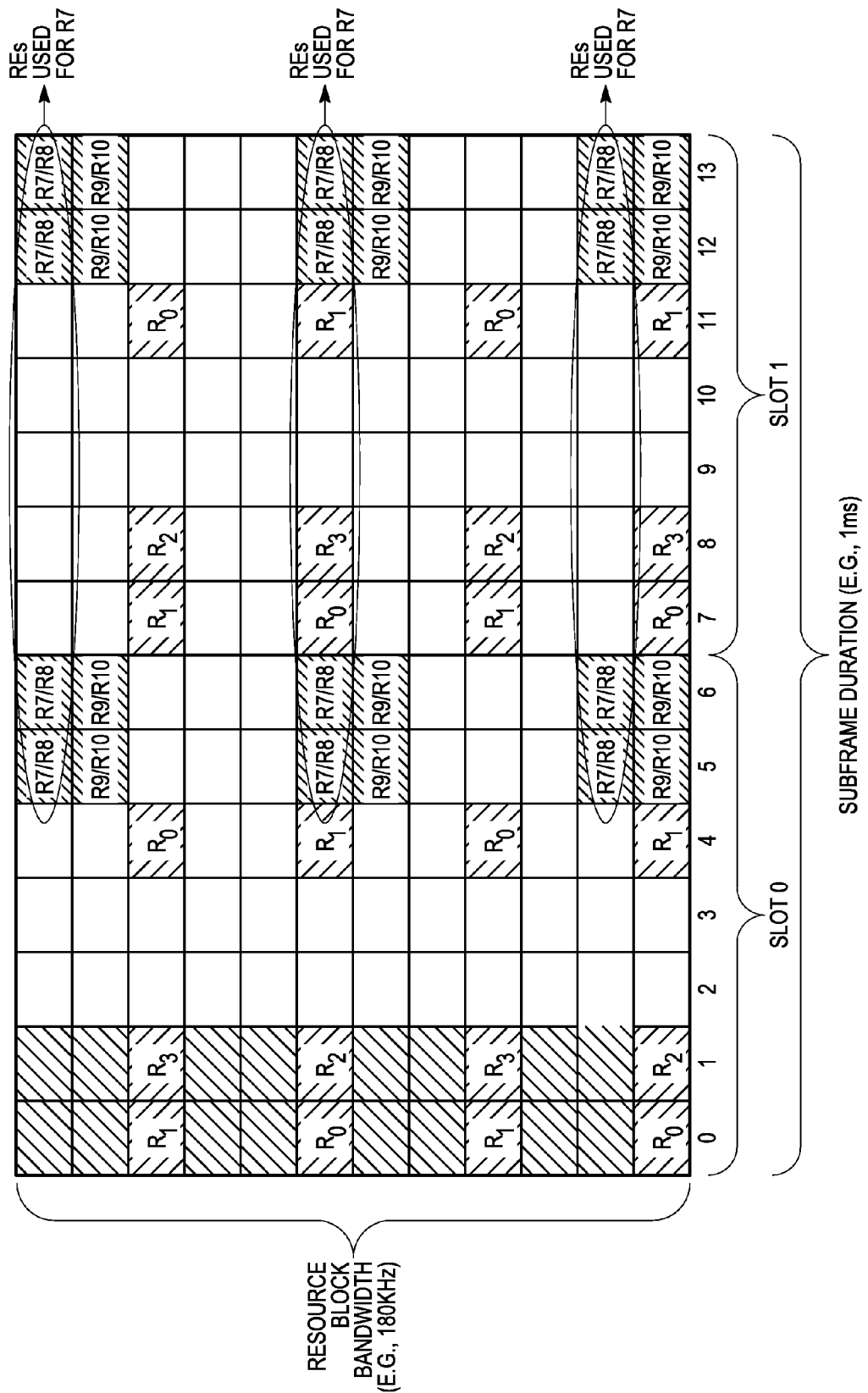
FIG. 5 is transmission structure for DMRS antenna ports 7, 8, 9 and 10 in a resource block pair. Other DMRS antenna ports i.e., ports 11,12,13,14 can be multiplexed on the same resource elements occupied by ports 7, 8, 9 and 10 by using a length 4 Walsh code.

FIG. 5 illustrates a transmission structure for DMRS antenna ports 7, 8, 9, 10 in an RB pair. It should be understood that RSs corresponding to a group of antenna ports may be mapped into the set of available REs using any multiplexing method known in the art or a combination thereof, for example, either code division multiplexing (CDM) or frequency/time division multiplexing where each individual antenna reference signal occupies a different RE. For example, RSs corresponding to antenna ports 7 and 8 are multiplexed using CDM and are mapped to the same REs in time and frequency domain. Other DMRS antenna ports i.e., ports 11, 13, can be multiplexed on the same resource elements occupied by ports 7, 8, by using a length 4 Walsh code in time-domain. Similarly, DMRS for antenna ports 12, 14 can be multiplexed on the same resource elements occupied by ports 9 and 10 by using a length 4 Walsh code in time-domain. For LTE Rel-8/9/10, PDSCH resources are typically allocated to UEs in terms of RB pairs. Given this, the UE can use pilots in both slot 0 and slot 1 for PDSCH demodulation. For example, if the UE is assigned to receive PDSCH resources using antenna port 7, it can use the pilot signals sent on 12 REs in the RB pair for channel estimation. E-PDCCH can be sent to the UE only in RBs in slot 0 or in RB pairs spanning both slot 0 and slot 1. It is desirable for the UE to decode DL control information sent on E-PDCCH as early as possible in each subframe to allow more PDSCH processing time as makes it easier for UE implementations to meet HARQ-ACK turnaround timing requirements. So, it is desirable for E-PDCCH to be sent to the UE in RBs only in slot 0.

Figure 6:
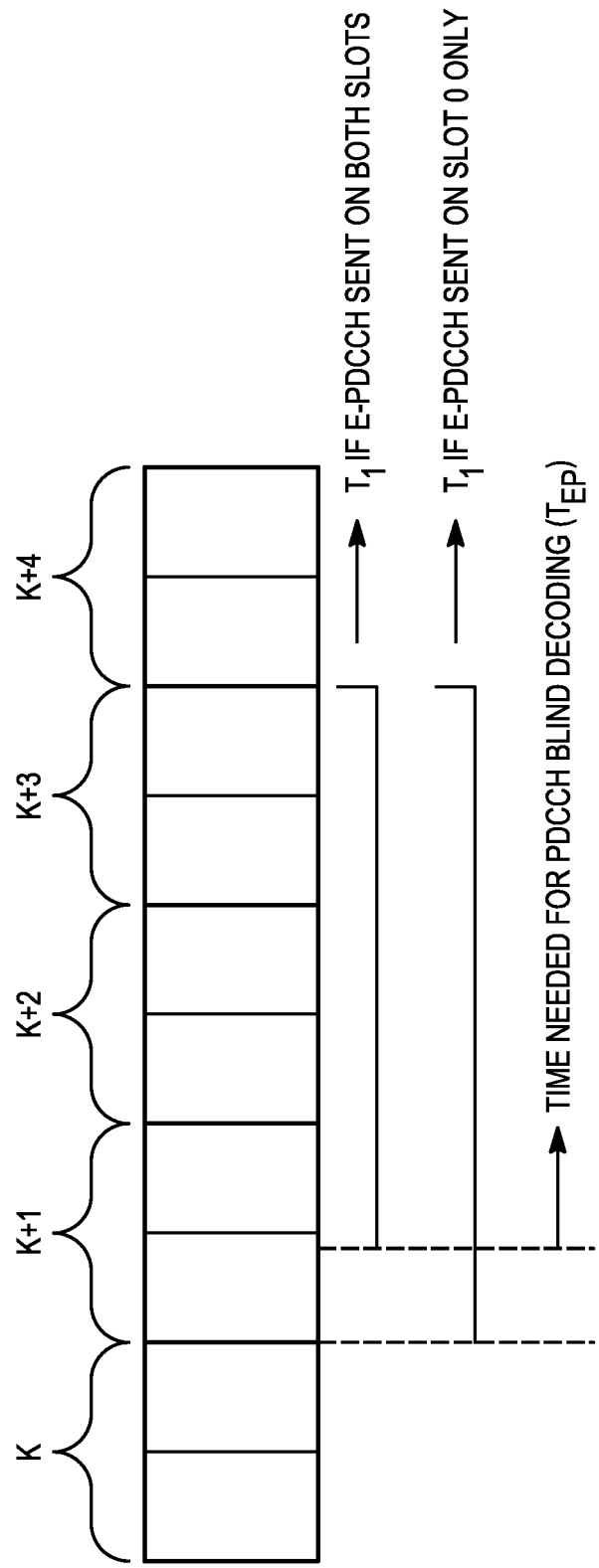
FIG. 6 illustrates HARQ-ACK turnaround time.

FIG. 6 illustrates an example. Assume subframe duration is Ts ms. For a PDSCH received in subframe k UE has to send HARQ-ACK corresponding to that PDSCH in subframe k+4. Since the PDSCH is scheduled in RB pairs, UE cannot start decoding PDSCH till the end of subframe k. Also, In order to transmit HARQ-ACK in subframe k+4, UE has to complete PDSCH decoding and HARQ-ACK preparation before the beginning of subframe k+4. So, the UE has a maximum of 3Ts ms for PDSCH decoding and HARQ-ACK preparation. Before the UE can start PDSCH decoding, it has to decode E-PDCCH. Decoding E-PDDCH involves searching various E-PDCCH candidates for the candidate that contains downlink control information (DCI) specifically addressed to the UE. This process is also referred to as E-PDCCH blind decoding. Although the E-PDCCH payload is typically small (<100 bits), due to blind decoding, the processing time required is non-trivial. Assume E-PDCCH decoding time is Tep ms. If the UE has to wait till the end of subframe k to decode E-PDCCH then, the UE has T1=3Ts-Tep ms to complete PDSCH decoding and prepare HARQ-ACK (HARQ-ACK preparation time). On the other hand if the UE can start decoding E-PDCCH in subframe k itself, i.e., at the end of the first slot itself (E-PDCCH early decoding) then the UE has T1=min (3Ts, 3.5Ts-Tep) ms for HARQ-ACK preparation. For example, if Ts=1 ms and Tep=0.4Ts=0.4 ms, then, without early decoding, the UE has 3-0.4=2.6 ms HARQ-ACK preparation time. With early decoding the UE has min (3, 3.5-0.4)=min (3, 3.1)=3 ms HARQ-ACK preparation time. In this example, early decoding increases HARQ-ACK preparation time available to the UE by 15%.

If the UE has to decode E-PDCCH only using REs in slot 0 (early decoding), it can only use the DMRS transmitted in the slot 0 (1$^{st}$ slot). With the current DMRS structure, if early decoding for E-PDDCH has to be supported, UE can only use the 6 DMRS available in the 1$^{st}$ slot for E-PDCCH reception. This is smaller than the number of DMRS available for PDSCH decoding (PDSCH has 12 since it is sent in RB pairs). This leads to degraded channel estimation performance which in turn leads to degraded DL E-PDCCH performance with early decoding when compared to PDSCH decoding performance. Typically, E-PDCCH decoding performance should be better than PDSCH decoding as E-PDCCH contains critical control information and no HARQ support. Therefore, mechanisms that improve E-PDCCH early decoding are required.

E-PDDCH early decoding performance is degraded with the current DMRS structure due degraded channel estimation. This can be compensated by sending E-PDCCH with a smaller encoding rate i.e., by allocating more REs for E-PDCCH transmission. However, this reduces spectral efficiency. An alternative solution is to modify the DMRS transmission structure for RBs in which E-PDCCH is sent such that UE receives more DMRS REs per slot. More specifically, to improve the performance of early decoding of DL E-PDCCH, DMRS RE mapping in RBs where E-PDCCH is transmitted can be modified so that 12 DMRS REs per antenna port per RB are available to the UE in the $1^{st}$ slot. Options for modifying the DMRS structure are described below.

Figure 7A:
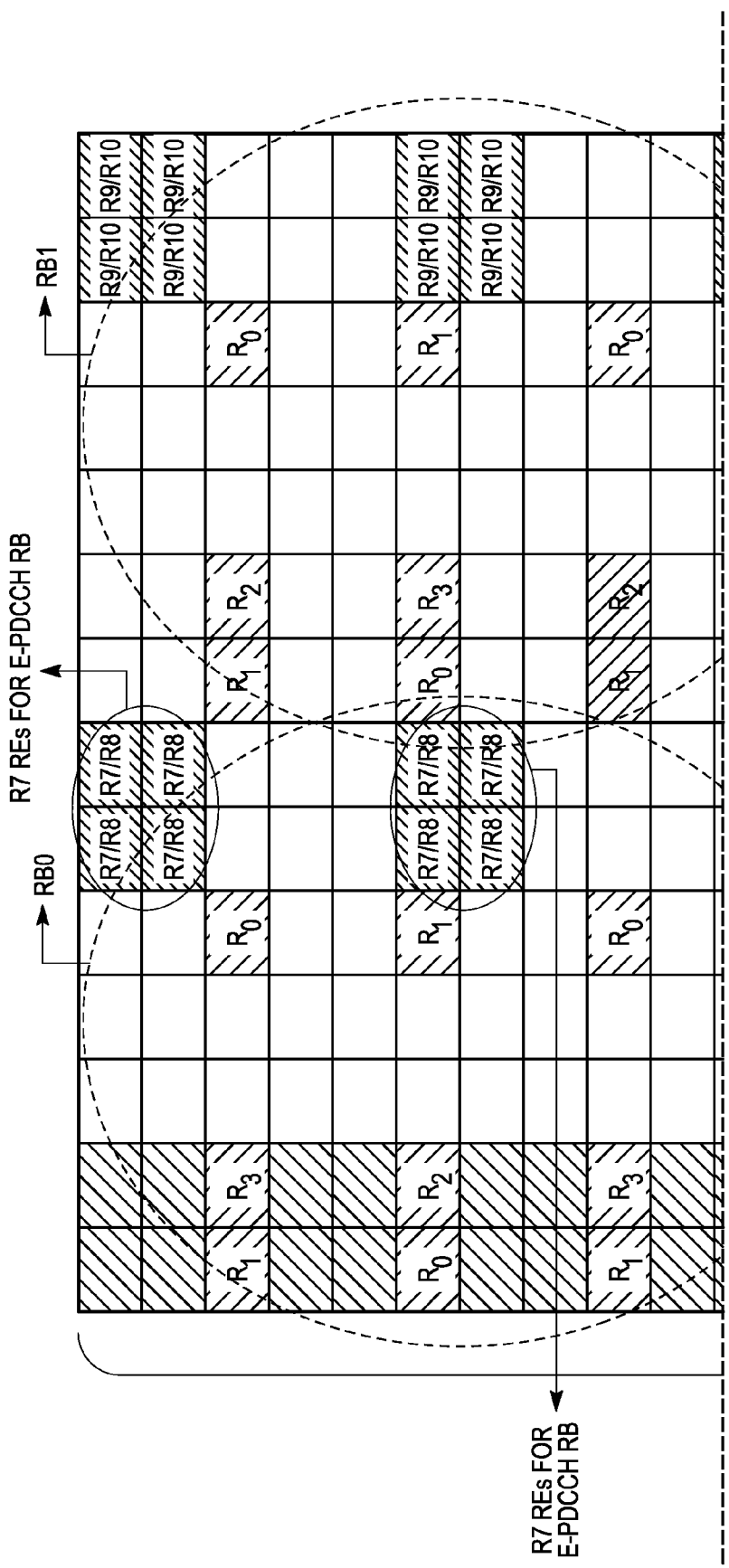
FIGS. 7A through 7C show a first modified DMRS Structure for EPDCCH RBs.
Figure 7B:
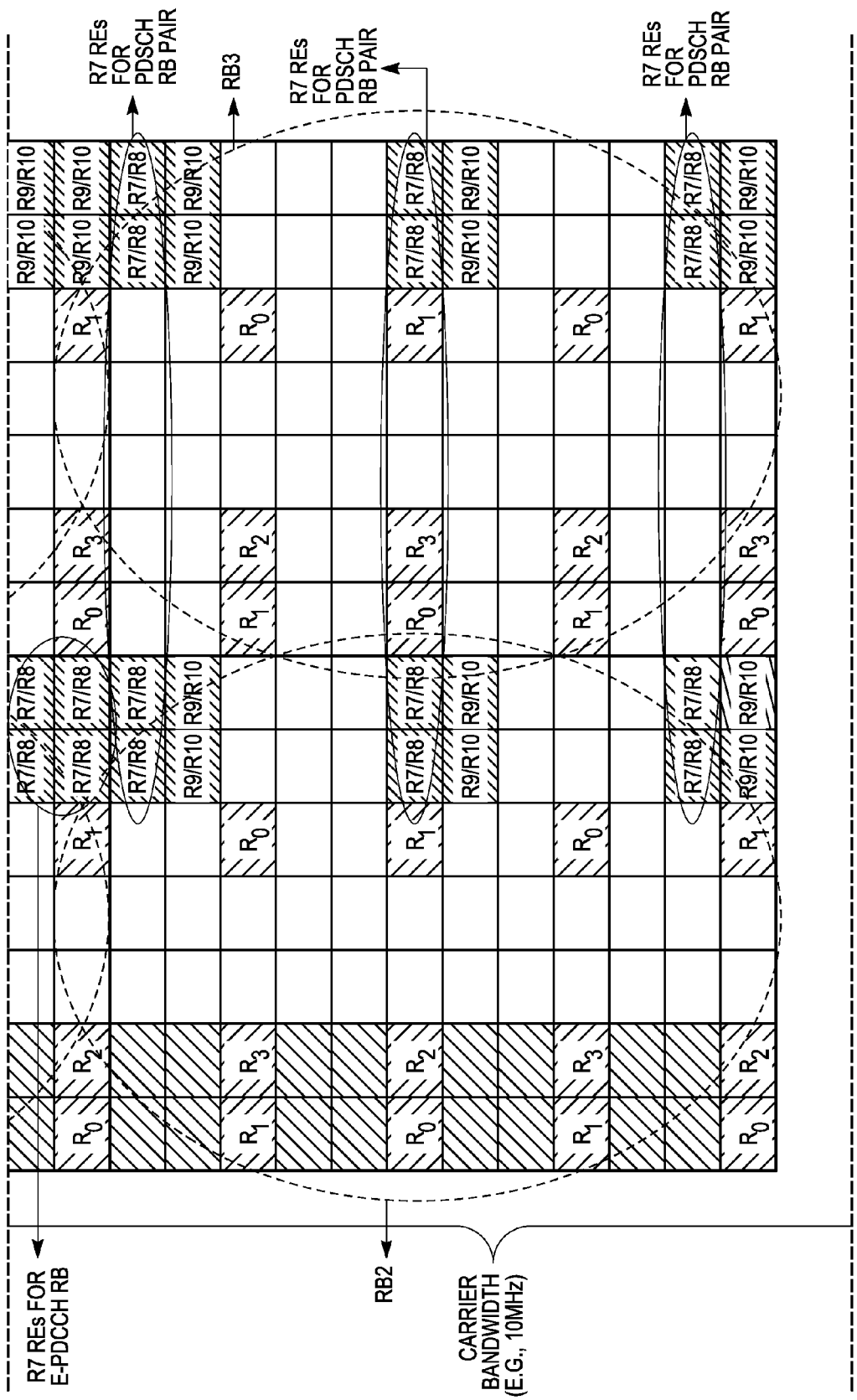
Figure 7C:
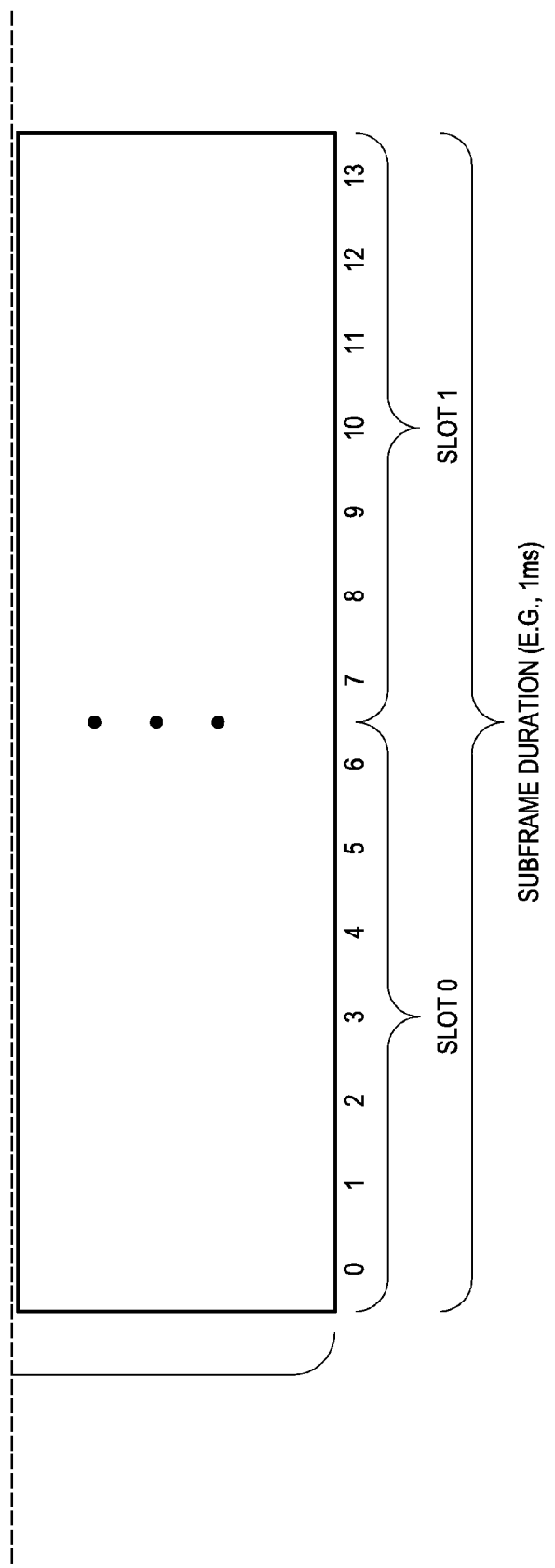

In FIGS. 7A through 7C, a DMRS Structure for EPDCCH RBs is changed in E-PDCCH RBs such that 12 REs are available for each of the antenna ports R7 and R8 a $1^{st}$ slot and 12 DMRS REs are available for each of the antenna ports R9 and R10 in a $2^{nd}$ slot. With this structure up to 2 DL E-PDCCHs can be sent in the first slot, one E-PDCCH on each antenna port 7 and 8. The second slot can be used for UL E-PDCCH transmission with up to 2 UL E-PDCCHs, one E-PDCCH on each antenna port 9 and 10. When compared to the prior art DMRS structure, the DMRS structure in FIGS. 7A through 7C provides improved channel estimation performance when early decoding is used for DL E-PDCCH. However, the number of DL E-PDDCHs that can be multiplexed in a PRB (with length 2 Walsh code) is reduced from 4 to 2. Also, if the second slot is allocated for PDSCH to the same UE, a different channel estimation scheme must be used for decoding PDSCH in RBs with DL E-PDCCH. In this embodiment, the EPDDCH RB comprises a first of frequency carriers and the PDCCH RB comprises a second set of frequency carriers and the second set of frequency carriers do not overlap with the first set of frequency carriers.

Generally, the UE can receive configuration signaling from the base unit, indicating to the UE, a set of RBs in a subframe that the UE should monitor for control channel signaling. For example, the control channel signaling can correspond to EPDCCH signaling. The set of RBs can be called control channel candidate set of RBs. Monitoring implies attempting to decode various control channel candidates in the control channel candidate set of RBs. To receive downlink control information (DCI) in the subframe, the UE has to successfully decode, at least one control channel candidate, in one or more RBs of the control channel candidate set of RBs. The configuration signaling from the base unit can be sent to the UE in the form of a radio resource control (RRC) message or, medium access control (MAC) layer message or a message sent on the PDCCH. Alternately, a UE can receive the configuration signaling in broadcast message such as a System Information Block (SIB) or a Master Information Block (MIB) in LTE systems. Typically, the master information block (MIB) is sent on the Physical Broadcast CHannel (PBCH), which in case of LTE Release-8 is sent on subframe 0 of a radio frame.

In one embodiment, a UE receives a first set of pilot signal resource elements and control information in one or more spatial layers in a first resource block in a subframe, wherein the first resource block spans a set of time symbols in a sub-frame and a first set of frequency carriers in the subframe. The UE also receives a second set of pilot signal resource elements and data in one or more spatial layers in a second resource block in the subframe, wherein the second resource block spans the same set of time symbols in the sub-frame and a second set of frequency carriers in the subframe. In FIGS. 7A through 7C, the subframe has only first and second slots, wherein the first and second resource blocks both span the set of time symbols in the first slot, wherein the first and second resource blocks share common time symbols in the first slot, identified as slot 0. FIGS. 7A through 7C illustrate that the UE receives the control information using only the first set of pilot signal resource elements.

The UE decodes the one or more spatial layers in which the control information is received using the first set of pilot signal resource elements in the first resource block, the first set of pilot signal resource elements comprising a first number of pilot signal resource elements per layer. The UE also decodes the one or more spatial layers in which the data is received using the second set of pilot signal resource elements in the second resource block, the second set of pilot signal resource elements comprising a second number of pilot signal resource elements per layer. The first number is greater than the second number. In FIGS. 7A through 7C, the first number of pilot signal resource elements per layer is a first number of pilot signal resource elements per layer per resource block, and the second number of pilot signal resource elements per layer is a second number of pilot signal resource elements per layer per resource block. Decoding the one or more spatial layers in which the control information is received using the first set of pilot signal resource elements includes performing channel estimation based on the first set of pilot resource elements. The UE generally decodes the one or more spatial layers in which the data is received in the second resource block using the control information that the UE has decoded in the one or more spatial layers in the first resource block.

In one implementation, the UE decodes a spatial layer in which the control information is received using the first set of pilot signal resource elements in the first resource block, the first set of pilot signal resource elements comprising the first number of pilot signal resource elements per layer, wherein the first set of pilot signal resource elements is associated with a first antenna port. The UE decodes a spatial layer in which the data is received using the second set of pilot signal resource elements in the second resource block, the second set of pilot signal resource elements comprising the second number of pilot signal resource elements per layer, wherein the second set of pilot signal resource elements is also associated with the first antenna port. For example, considering the subframe structure shown in FIGS. 7A through 7C, if a UE expects that control information (in EPDCCH) is sent in a spatial layer in RB0 and, the spatial layer is mapped to antenna port 7, the UE can use the set of pilot signal resource elements associated with antenna port 7 in RB0 (marked R7/R8 in the figures) to decode the control information sent in the spatial layer. In this case, the set of pilot signal resource elements associated with antenna port 7 comprises 12 pilot signal resource elements due to the modified DMRS structure used in the RB (RB0) where control is sent. Further, if the UE determines that data (in PDSCH) is sent in a spatial layer in RB2 and, the spatial layer is mapped to antenna port 7, the UE can use the set of pilot signal resource elements associated with antenna port 7 in RB2 (marked R7/R8 in the figures) to decode the control information sent in the spatial layer. In this case, the set of pilot signal resource elements associated with antenna port 7 comprises 6 pilot signal resource elements as the legacy DMRS structure (i.e., LTE Rel10) used in the RB (RB2) where data is sent. The UE can determine the set of RBs on which control information is expected based on configuration signaling from the eNB. It should be noted that, if data is sent to the UE in multiple spatial layers in RB2, for example, in two spatial layers, one mapped to antenna port 7 and another mapped to antenna port 8, the UE can use the set of pilot signal resource elements associated with antenna port 7 to decode data in the spatial layer mapped to antenna port 7 and, it can use the set of pilot signal resource elements associated with antenna port 8, to decode the data in the spatial layer mapped to antenna port 8. That is, on a per spatial layer basis, it can use 6 pilot signal resource elements per layer in RB2 to, decode the data.

In another implementation, the UE decodes a spatial layer in which the control information is received using the first set of pilot signal resource elements in the first resource block, the first set of pilot signal resource elements comprising the first number of pilot signal resource elements per layer, wherein the first set of pilot signal resource elements is associated with a first antenna port and a second antenna port. The UE also decodes a spatial layer in which the data is received using the second set of pilot signal resource elements in the second resource block, the second set of pilot signal resource elements comprising the second number of pilot signal resource elements per layer, wherein the second set of pilot signal resource elements is associated with a third antenna port. The first set of pilot signal resource elements and the second set of pilot signal resource elements occupy common time symbols in the subframe. In one embodiment, the first antenna port is the same as the third antenna port and in another embodiment the first and third antenna ports are different. For example, if control information (in EPDCCH) for a UE is sent in a spatial layer in a first RB and, the spatial layer is mapped to two antenna ports, antenna port 7 and antenna port 9, the UE can use a first set of pilot signal resource elements associated with both the antenna ports to decode the control information sent in the spatial layer. In this case, since the spatial layer in the first RB is mapped to two antenna ports, the number of pilot signal resource elements in the first set is equal to the sum of the number of pilot signal resource elements associated with antenna port 7 and the number of pilot signal resource elements associated with antenna port 9. If data is sent for the UE in a spatial layer in a second RB and, the spatial layer is mapped to one antenna port, antenna port 7, the UE can use a second set of pilot signal resource elements in the second RB associated with antenna ports 7 to decode the data sent in the spatial layer. Assume RB0 with the DMRS structure in FIGS. 2A through 2C as the first RB and RB2 with the DMRS structure in FIGS. 2A through 2C as the second RB. Considering RB0, 6 pilot signal resource elements are associated with antenna port 7 and, 6 pilot signal resource elements are associated with antenna port 9. Therefore, with this implementation, the UE can use 12 pilot signal resource elements to decode control information sent in a spatial layer in RB0. Considering RB2, 6 pilot signal resource elements are associated with antenna port 7. Therefore, the UE can use 6 pilot signal resource elements to decode data sent in a spatial layer in RB2. More generally, with this implementation, to decode control information in a spatial layer in a first RB, the UE can assume a first spatial layer to antenna port mapping (e.g., one spatial layer mapped to two antenna ports) and, to receive data in a spatial layer in a second RB, the UE can assume a second spatial layer to antenna port mapping (e.g. one spatial layer mapped to one antenna port). With this implementation, the number of pilot signal resource elements that the UE can use to receive control information in a spatial layer in an RB is increased without modifying the DMRS structure in the RB. In an alternate implementation, control information (in EPDCCH) for a UE is replicated and transmitted on two spatial layers in a first RB with the first spatial layer associated with a first antenna port (e.g., antenna port 7) and the second spatial layer associated with a second antenna port (e.g., antenna port 9). The replication of the control information on the two spatial layers results in effective single layer for the control information. The effective precoding on the control information is the sum of the precoding applied for the first spatial layer on the first antenna port and the precoding on the second spatial layer on the second antenna port. The UE can thus use a first set of pilot signal resource elements associated with both the antenna ports to decode the control information sent in the two spatial layer. The number of pilot signal resource elements in the first set is equal to the sum of the number of pilot signal resource elements associated with antenna port 7 and the number of pilot signal resource elements associated with antenna port 9.

In another embodiment, the UE receives a third set of pilot signal resource elements and data in one or more spatial layers in a third resource block in the subframe, wherein the third resource block spans a second set of time symbols in the sub-frame and the first set of frequency carriers in the sub-frame. Here, the second set of time symbols in the sub-frame is different than the first set of time symbols in the subframe. In FIGS. 7A through 7C, the first resource block is in slot 0 spanning time symbols 0-6 and the third resource block is in slot 1 spanning time symbols 7-13. In this embodiment, the first and third resource blocks share the first set of frequency carriers. According to this embodiment, the UE decodes the one or more spatial layers in which the data is received in the third resource block using the third set of pilot signal resource elements, the third set of pilot signal resource elements comprising a third number of pilot signal resource elements per layer wherein the third number is at least equal to or greater than the first number. In one implementation, the third number is equal to twice the first number.

Figure 8A:
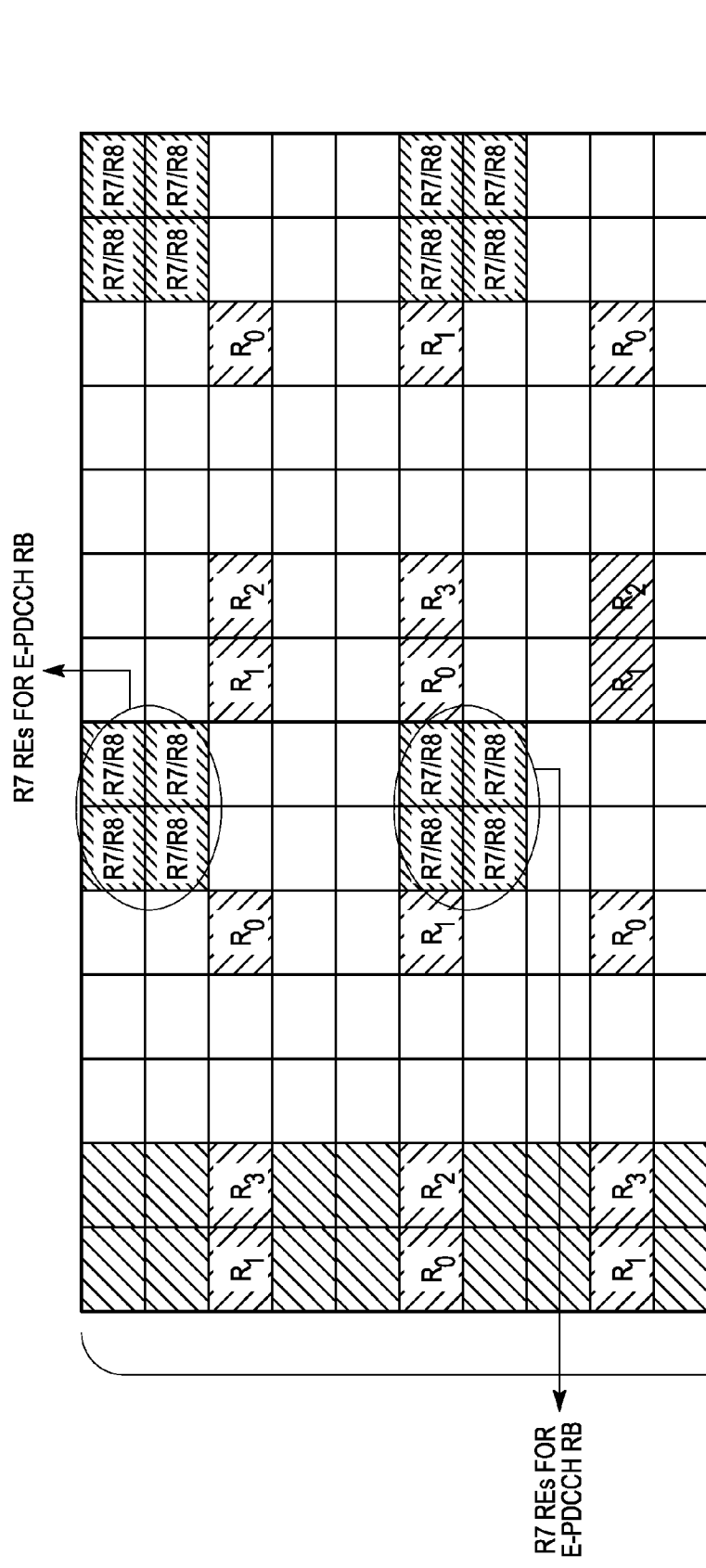
FIGS. 8A through 8C show a second modified DMRS Structure for EPDCCH RBs.
Figure 8B:
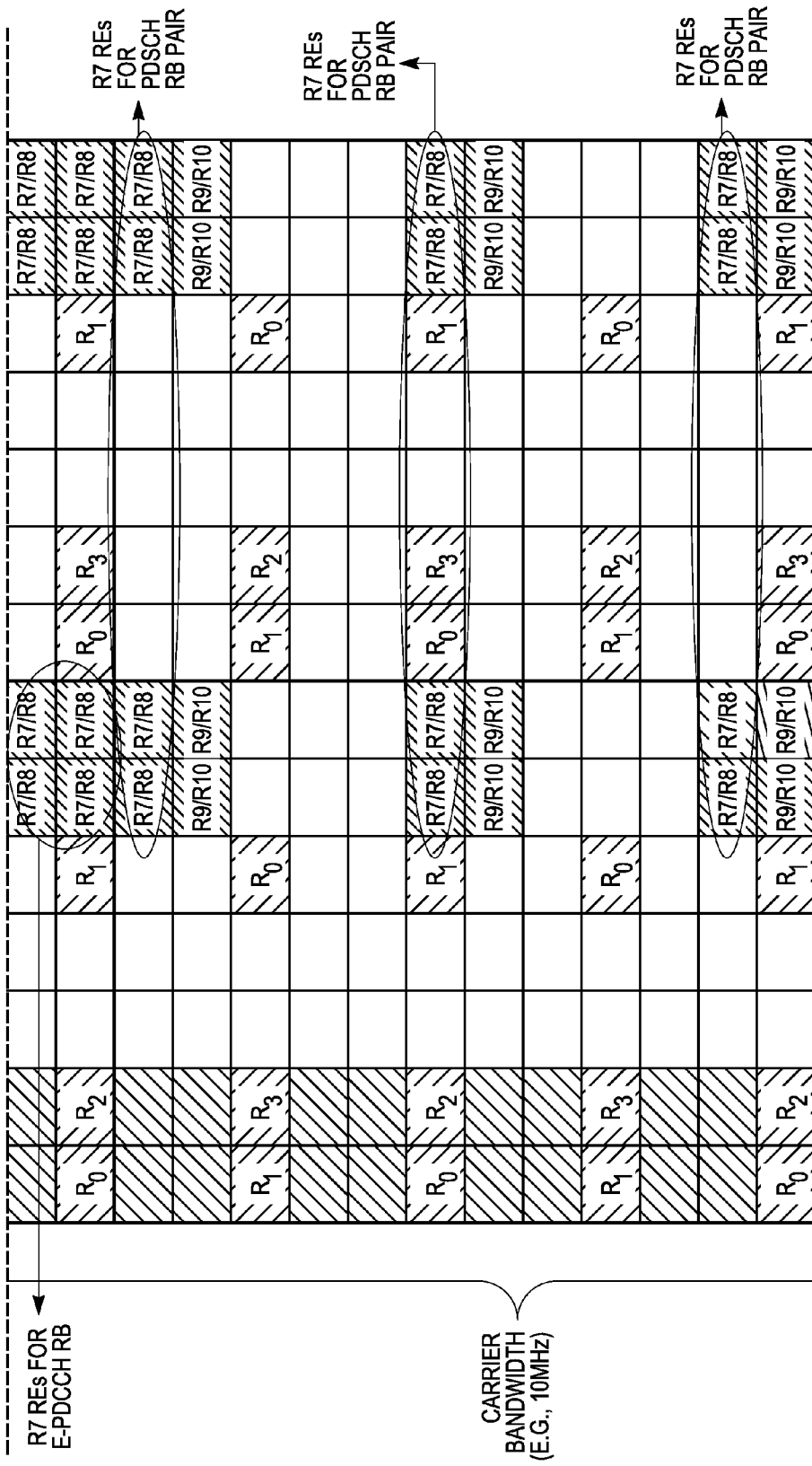
Figure 8C:
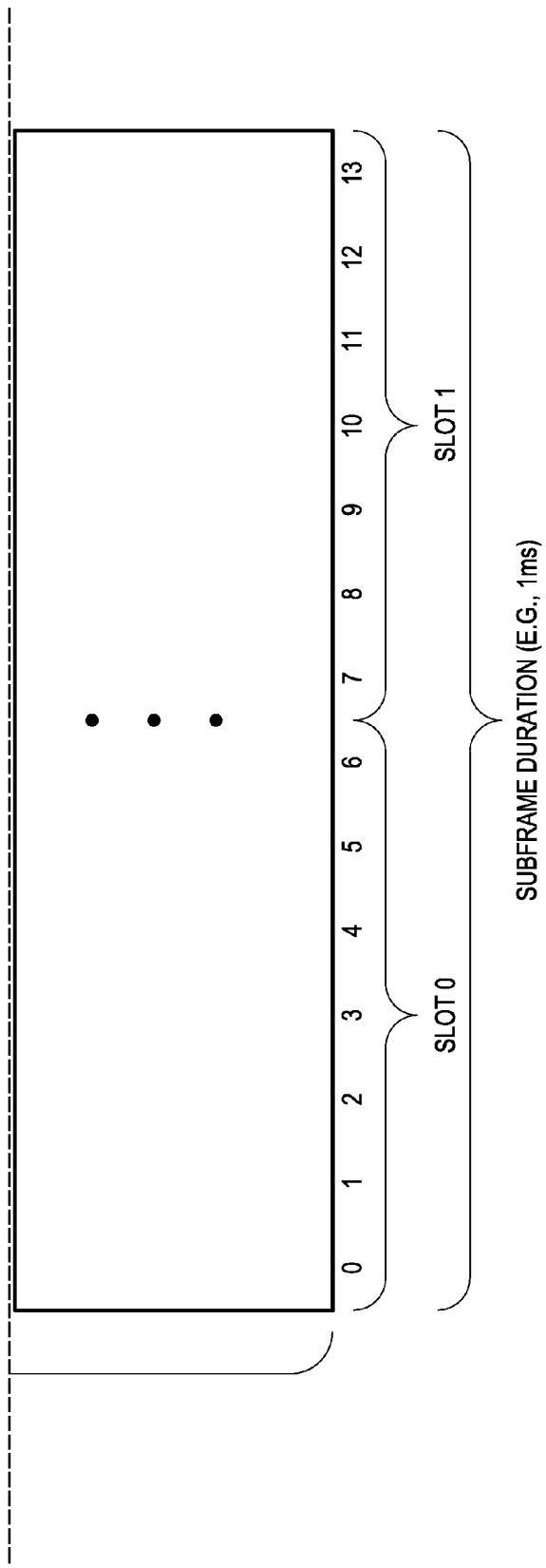

The modified DMRS structure of FIGS. 8A through 8C is similar to the embodiment of FIGS. 7A through 7C for the $1^{st}$ slot. However the $2^{nd}$ slot of FIGS. 8A through 8C is different as follows: Instead of remapping the DMRS REs in slot 1 to antenna ports 9 and 10, the DMRS REs are used for antenna ports 7 and 8. With this structure, 2 DL E-PDCCHs can be sent in the first slot (E-PDCCH on each antenna ports 7 and 8). The second slot can be used for UL E-PDCCH transmission or for PDSCH transmission. When an RB pair is used to transmit E-PDCCH and PDSCH (e.g., using antenna port R7) for the same user, then for PDSCH demodulation, the UE can use 12 DMRS REs available in $1^{st}$ slot RB and 12 DMRS REs available in $2^{nd}$ slot RB for channel estimation. Alternatively, the UE may use six DMRS REs in the $1^{st}$ slot and six DMRS REs in the $2^{nd}$ slot. With this option, DMRS structure for PDSCH demodulation for antenna port 7 and antenna port 8 is not changed from LTE Rel-10).

When compared to the prior art DMRS structure, the DMRS structure of FIGS. 8A through 8C provides improved channel estimation performance when early decoding is used for DL E-PDCCH. When compared to the DMRS structure of FIGS. 7A through 7C, it is easier for UE implementation to handle PDSCH decoding in slot 1 (i.e., same DMRS mapping can be assumed in RB pairs containing E-PDCCH and RB pairs containing PDSCH). However, when compared to current Rel-10 DMRS structure, in the modified DMRS structure of FIGS. 8A through 8C the number of ports (e.g., number of DL EPDCCH) that can be multiplexed in a PRB-pair (with length 2 Walsh code) is reduced from 4 to 2. Also, if the $2^{nd}$ slot is allocated for PDSCH to the same UE (instead of an E-PDCCH to same or different UE) the maximum number of PDSCH layers for second slot is restricted to 2. Pilot overhead is also increased.

While the discussion so far considers transmissions using 4 antenna ports 7, 8, 9, 10 that are sent to the UE using length 2 Walsh codes (in time-domain), it can be extended to cover 8 antenna ports 7, 8, 9, 10, 11, 12, 13, 14 with length 4 Walsh codes.

For the modified DMRS structures of FIGS. 7A through 7C and 8A through 8C, the aspect of a UE receiving two different RBs (one RB for E-PDCCH and one RB for PDSCH) occupying same time symbols with different pilot structure for the same antenna port was not needed in current and legacy 3GPP systems since the UE was expected to receive only PDSCH using DMRS and PDSCH was always assigned using RB pairs. However, for LTE Rel-11, the UE is expected to receive both E-PDCCH and PDSCH in the same set of time symbols. If E-PDCCH is restricted to $1^{st}$ slot only (this is desirable for early decoding), the new DMRS structures in FIGS. 7A through 7C and FIGS. 8A through 8C are beneficial for enhanced channel estimation.

If E-PDCCH is sent in $1^{st}$ slot (slot 0) of an RB pair in a subframe and if the $2^{nd}$ slot (slot 1) of the RB pair in the subframe is allocated for PDSCH, and if the UE can assume that MU-MIMO (Multi-user MIMO) operation is not performed on the E-PDCCH in $1^{st}$ slot, then up to 5 layers can be supported for PDSCH in the $2^{nd}$ slot using a subset of the length-4 OCC (Orthogonal Cover Code) on both reference signal CDM groups. In FIGS. 2A through 2C, CDM group 1 corresponds to set of reference signal resource elements on subcarrier 0, 5, 10 in a RB-pair (e.g., RB0 and RB2) and CDM group 2 corresponds to set of reference signal resource elements on subcarrier 1, 6, 11 in a RB-pair. CDM group 1 is associated with antenna port 7, 8, 11, 13 using length-4 OCC (e.g., Walsh) in the time-domain while CDM group 1 is associated with antenna port 9, 10, 12, 14 using length-4 OCC (e.g., Walsh) in the time-domain. The OCC code for an antenna port may be permuted (e.g., time-reversal) on different subcarriers in the RB-pair. Supporting up to 5 layers for PDSCH in the $2^{nd}$ slot, however, would require a different layer-to-antenna port mapping for layers 2-4 than Rel-10 for such RBs with PDSCH on $2^{nd}$ slot.

For example if E-PDCCH based on DMRS REs associated with antenna port 7 is received by the UE in a first RB of an RB pair in the first slot of a subframe, the possible PDSCH layer to antenna port mapping methods for receiving a second RB of the same RB pair in the second slot of the subframe are as follows 2 PDSCH layers: ports 7, 8
3 PDSCH layers: ports 7, 8, 10
4 PDSCH layers: ports 7, 8, 10, 14
5 PDSCH layers: ports 7, 8, 10, 13, 14.

with up to rank 4 transmission. This imposes a minor scheduling restriction at the eNB, which is not a significant constraint.

In one embodiment, the UE is configured to receive control information (e.g. EPDCCH) in a plurality of resource blocks in a sub frame. The UE decodes control information based on a first antenna port, in one of the plurality of resource blocks in a first slot of the subframe. The UE determines its data allocation (e.g. PDSCH allocation) based on the decoded control information. The data allocation can be determined as a set of resource blocks. The UE then can determine a first set of resource blocks in the second slot of the subframe that are not overlapping with the plurality of resource blocks for which it is configured to receive control information. The UE can then decode (or demodulate) data (PDSCH) in the first set of resource blocks using a first set of preconfigured antenna ports. The UE can also determine a second set of resource blocks in the second slot of the subframe that are overlapping with the plurality of resource blocks for which it is configured to receive control information. The UE can then decode (or demodulate) data (PDSCH) in the second set of resource blocks using a second set of preconfigured antenna ports where the second set of preconfigured antenna ports are different from the first set of preconfigured antenna ports. In one implementation, the first set of preconfigured antenna ports can correspond to antenna port sets {7}, {7,8}, {7,8,9}, {7,8,9,10} for rank 1, 2, 3 and 4 transmission respectively. The second set of preconfigured antenna ports can correspond to antenna port sets {8}, {8,10}, {8,10,13}, {8,10,13,14} for rank 1, 2, 3 and 4 respectively. The UE can further determine a set of resource blocks in which it can receive both control and data transmissions and, for the determined set of resource blocks, the UE can use a third set of preconfigured antenna ports for receiving data. The third set of preconfigured antenna ports can correspond to one or more of the antenna port sets {7}, {7,8}, {7,8,10}, {7,8,10,13}, {7,8,10,13,14} for rank 1, 2, 3, 4 and 5, respectively.

While the present disclosure and the best modes thereof have been described in a manner establishing possession and

TABLE 1

Antenna ports useable for PDSCH in $2^{nd}$ slot given EPDCCH received in in $1^{st}$ slot using antenna port 7 (no MU for EPDCCH)

| Antenna port p | [$\bar{w}_p(0)$ $\bar{w}_p(1)$ $\bar{w}_p(2)$ $\bar{w}_p(3)$] | EPDCCH/PDSCH spatial layer mapping |
| --- | --- | --- |
| 7 | [+1 +1 +1 +1] | Usable for PDSCH using the length 4 Walsh code in right column in both slots (E-PDDCH also received using antenna port 7 but in in $1^{st}$ slot only using (+1, +1)). |
| 8 | [+1 −1 +1 −1] | Usable for PDSCH using the length 4 Walsh code in right column in both slots |
| 9 | [+1 +1 +1 +1] | Not usable for PDSCH |
| 10 | [+1 −1 +1 −1] | Usable for PDSCH using the length 4 Walsh code in right column in both slots |
| 11 | [+1 +1 −1 −1] | Not usable for PDSCH |
| 12 | [−1 −1 +1 +1] | Not usable for PDSCH |
| 13 | [+1 −1 −1 +1] | Usable for PDSCH using the length 4 Walsh code in right column in both slots |
| 14 | [−1 +1 +1 −1] | Usable for PDSCH using the length 4 Walsh code in right column in both slots |

Further, with no restriction on the UE for which PDSCH is scheduled in the second slot, a reduced rank transmission ($<=4$) (with fixed set of ports 8, 10, 13 and 14) can be supported in RBs overlapping with EPDCCH. i.e., EPDCCH can be allocated to UE1, and PDSCH can be allocated to any UEx enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal, the method comprising:
receiving a first set of pilot signal resource elements and control information in one or more spatial layers in a first set of time symbols in a first resource block in a subframe, the first resource block spanning a set of time symbols in a sub frame and a first set of frequency carriers in the sub-frame;
receiving a second set of pilot signal resource elements and data in one or more spatial layers in the first set of time symbols in a second resource block in the subframe, the second resource block spanning the set of time symbols in the sub frame and a second set of frequency carriers in the sub-frame;
decoding the one or more spatial layers in which the control information is received using the first set of pilot signal resource elements, the first set of pilot signal resource elements comprising a first number of pilot signal resource elements per layer;
and decoding the one or more spatial layers in which the data are received in the second resource block using the second set of pilot signal resource elements, the second set of pilot signal resource elements comprising a second number of pilot signal resource elements per layer, the second number of pilot signal resource elements present in the second resource block;
wherein the first number is greater than the second number;
receiving a third set of pilot signal resource elements and data in one or more spatial layers in a third resource block in the subframe, the third resource block spanning a second set of time symbols in the sub-frame and the first set of frequency carriers in the sub-frame; and
decoding the one or more spatial layers in which the data are received in the third resource block using the third set of pilot signal resource elements, the third set of pilot signal resource elements comprising a third number of pilot signal resource elements per layer wherein the third number is at least equal to the first number;
wherein the second set of time symbols in the sub-frame is different from the first set of time symbols in the subframe.

2. The method of claim 1:
wherein the first number of pilot signal resource elements per layer is a first number of pilot signal resource elements per layer per resource block; and
wherein the second number of pilot signal resource elements per layer is a second number of pilot signal resource elements per layer per resource block.

3. The method of claim 1 wherein the second set of frequency carriers are non-overlapping with the first set of frequency carriers.

4. The method of claim 1 wherein a size of the second set of frequency carriers is same as a size of the first set of frequency carriers.

5. The method of claim 1 further comprising decoding the one or more spatial layers in which the control information is received using the first set of pilot signal resource elements includes performing channel estimation based on the first set of pilot resource elements.

6. The method of claim 1 wherein the third number is equal to twice the first number.

7. The method of claim 1 further comprising:
decoding a spatial layer in which the control information is received using the first set of pilot signal resource elements, the first set of pilot signal resource elements associated with a first antenna port; and
decoding a spatial layer in which the data are received using a second set of pilot signal resource elements, the second set of pilot signal resource elements associated with the first antenna port.

8. The method of claim 7 wherein the first set of pilot signal resource elements and the second set of pilot signal resource elements occupy common time symbols in the subframe.

9. The method of claim 7 further comprising receiving control information using only the first set of pilot signal resource elements.

10. The method of claim 1 further comprising:
decoding a spatial layer in which the control information is received using the first set of pilot signal resource elements, the first set of pilot signal resource elements associated with a first antenna port and a second antenna port; and
decoding a spatial layer in which the data are received using the second set of pilot signal resource elements, the second set of pilot signal resource elements associated with a third antenna port.

11. The method of claim 10 wherein the first set of pilot signal resource elements and the second set of pilot signal resource elements occupy common time symbols in the subframe.

12. The method of 10 wherein the first antenna port is the same as the third antenna port.

13. The method of claim 1 further comprising:
determining that data are expected in the second resource block in the subframe using the control information; and
decoding the one or more spatial layers in which the data are received in the second resource block using the control information.

14. The method of claim 1 further comprising determining that control information is expected in the first resource block in the subframe based on a signal received from a base unit.

* * * * *